United States Patent
Guo et al.

(10) Patent No.: US 10,323,590 B2
(45) Date of Patent: Jun. 18, 2019

(54) METHOD AND SYSTEM FOR PLUG FOULING MONITORING AND CLEANING

(71) Applicant: Ford Global Technologies, LLC, Dearborn, MI (US)

(72) Inventors: Yichao Guo, Rochester Hills, MI (US); Christopher Richard Weber, Plymouth, MI (US); Nelson William Morrow, Jr., Saline, MI (US); C. Scott Langley, Canton, MI (US); Tamra Green, Stockbridge, MI (US); Robert Sarow Baskins, Grass Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 433 days.

(21) Appl. No.: 15/282,611

(22) Filed: Sep. 30, 2016

(65) Prior Publication Data
US 2018/0094597 A1   Apr. 5, 2018

(51) Int. Cl.
| F02D 41/06 | (2006.01) |
| F02D 41/22 | (2006.01) |
| F02P 11/00 | (2006.01) |
| F02D 41/24 | (2006.01) |

(52) U.S. Cl.
CPC ........... *F02D 41/064* (2013.01); *F02D 41/22* (2013.01); *F02P 11/00* (2013.01); *F02D 41/2403* (2013.01); *F02D 2200/021* (2013.01); *Y02T 10/40* (2013.01)

(58) Field of Classification Search
CPC ........ F02D 41/06; F02D 41/064; F02D 41/22; F02D 41/2403; F02D 2200/021; F02P 11/00; Y02T 10/40
See application file for complete search history.

(56) References Cited

U.S. PATENT DOCUMENTS

| 5,142,479 A | 8/1992 | Poirier et al. |
| 6,874,464 B2 | 4/2005 | Montgomery |
| 8,150,604 B2 | 4/2012 | Ma et al. |

*Primary Examiner* — Hieu T Vo
(74) *Attorney, Agent, or Firm* — Julia Voutyras; McCoy Russell LLP

(57) ABSTRACT

Methods and systems are provided for detecting spark plug fouling and cleaning up fouled spark plug during pre-delivery phase of a vehicle. In one example, a method may include updating a spark plug fouling index saved in the non-volatile memory of the vehicle based on engine operating parameters, and indicating spark plug fouling based on the updated index. The method may further include cleaning the fouled spark plug by driving the vehicle along a planned route.

20 Claims, 7 Drawing Sheets dealership. FIG. 2 shows an example method of tracking spark plug fouling with a spark plug fouling index saved in a nonvolatile memory of the vehicle. The spark plug fouling index may be updated during each engine run in the pre-delivery phase of the vehicle according to FIG. 3A. After vehicle delivery to the dealership, the spark plug fouling index may continue to be updated according to FIG. 3B. A

METHOD AND SYSTEM FOR PLUG FOULING MONITORING AND CLEANING

FIELD

The present description relates generally to methods and systems for monitoring spark plug fouling and cleaning the fouled spark plug before delivering a vehicle to the dealership.

BACKGROUND/SUMMARY

A spark plug may be coupled to a cylinder of an internal combustion engine to ignite a compressed air and fuel charge within the cylinder. A spark plug may be considered fouled when an insulator nose at the firing tip of the spark plug is covered with a foreign substance such as fuel, oil, and/or carbon residue. A fouled spark plug may cause misfire, resulting in loss of power and increased vehicle emissions.

Other attempts to address spark plug fouling include controlling engine operation based on operation in a previous run period. One example approach is shown by Ma et al. in U.S. Pat. No. 8,150,604 B2. Therein, a spark fouling condition is determined based on fuel mass during the previous engine run period, between a start and stopping of the engine. In response to spark fouling condition, engine parameters such as air-fuel ratio and spark timing are adjusted while the engine is running.

However, the inventors herein have recognized potential issues with such method. As one example, the prior method may not be able to address spark plug fouling during the pre-delivery phase of a vehicle. Due to pre-delivery plant marshalling, the engine may be started multiple times without sufficient warming up. The excessive number of engine starts may contribute significant amounts of deposits to the spark plugs and yield fouled plugs. Spark plug fouling in the pre-delivery phase may end up with misfire and check engine lights displayed in new vehicles, which may lead to new vehicle owner dissatisfaction and increased warranty costs. Further, due to the limited engine run period in the pre-delivery phase, prior spark fouling mitigating methods may not be effective in fully cleaning up the spark plug fouled during the pre-delivery phase.

In one example, the issues described above may be addressed by a method comprising: during a pre-delivery phase of a vehicle, increasing a spark plug fouling index saved in a nonvolatile memory in response to an engine start; and operating the engine to clean the spark plug in response to the updated spark plug fouling index being higher than a threshold. In this way, spark plug fouling may be identified and the fouled plug may be cleaned before delivering the vehicle to the dealership before and/or in addition to post-delivery fouling cleaning operations.

As one example, a vehicle may be set, either manually or automatically, in a pre-delivery mode before being delivered to the dealership. While the vehicle is in the pre-delivery mode, in response to each engine start, a spark plug fouling index saved in a nonvolatile memory is updated. In an embodiment, the spark plug fouling index may be updated solely responsive to engine start. In another embodiment, the spark plug fouling index may be further updated based on engine operating parameters such as engine coolant temperature and engine run time. By saving the spark plug fouling index in the nonvolatile memory, the index may reflect spark plug fouling due to foreign substance accumulation during multiple engine run periods. The method may further include displaying a plug fouling indicator and flashing the indicator at a frequency based on the spark plug fouling index to show the severity of plug fouling. In response to spark plug fouling, an inspector may drive the vehicle along a planned route for a time period with both engine speed and engine load in a predetermined range to clean the spark plug. During the plug cleaning process, the spark plug fouling index and frequency of the plug fouling indicator may continue to be updated, so that the inspector may know the progress of the cleaning by checking the fouling indicator. The plug fouling indicator may be disabled upon finishing the plug cleaning process. In this way, status related to spark plug fouling may be indicated via a single indicator through the pre-delivery phase of the vehicle. By driving the vehicle along the planned route, fouled spark plug may be more effectively cleaned. After delivering the vehicle to the dealership, the vehicle may be set to a post-delivery mode, either manually or automatically. The spark plug fouling index may continue to be updated during the post-delivery phase and serve as a factor in determining ignition system health.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
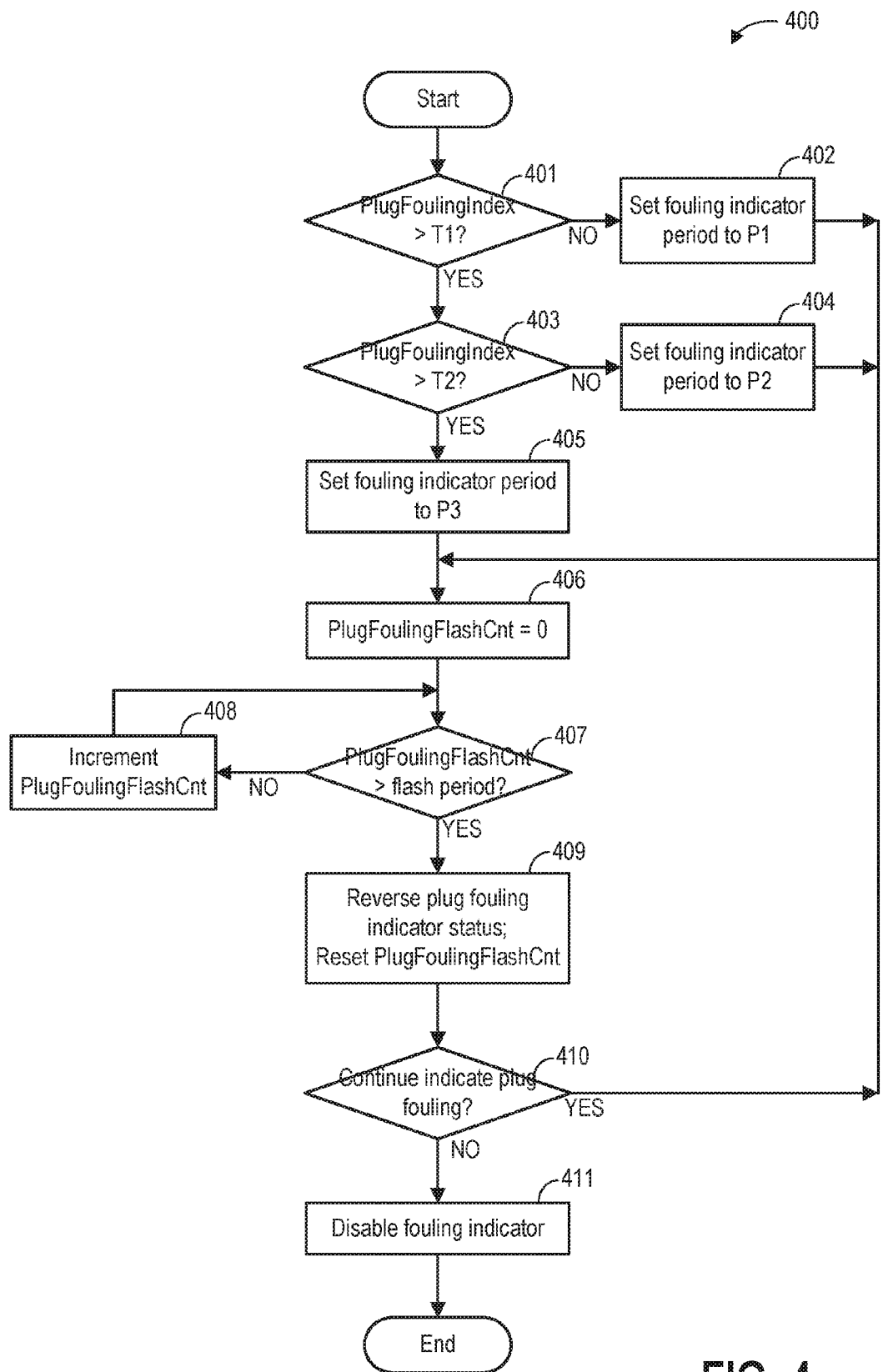
FIG. 4 shows a flow chart for indicating spark plug fouling based on the spark plug fouling index.
Figure 5:
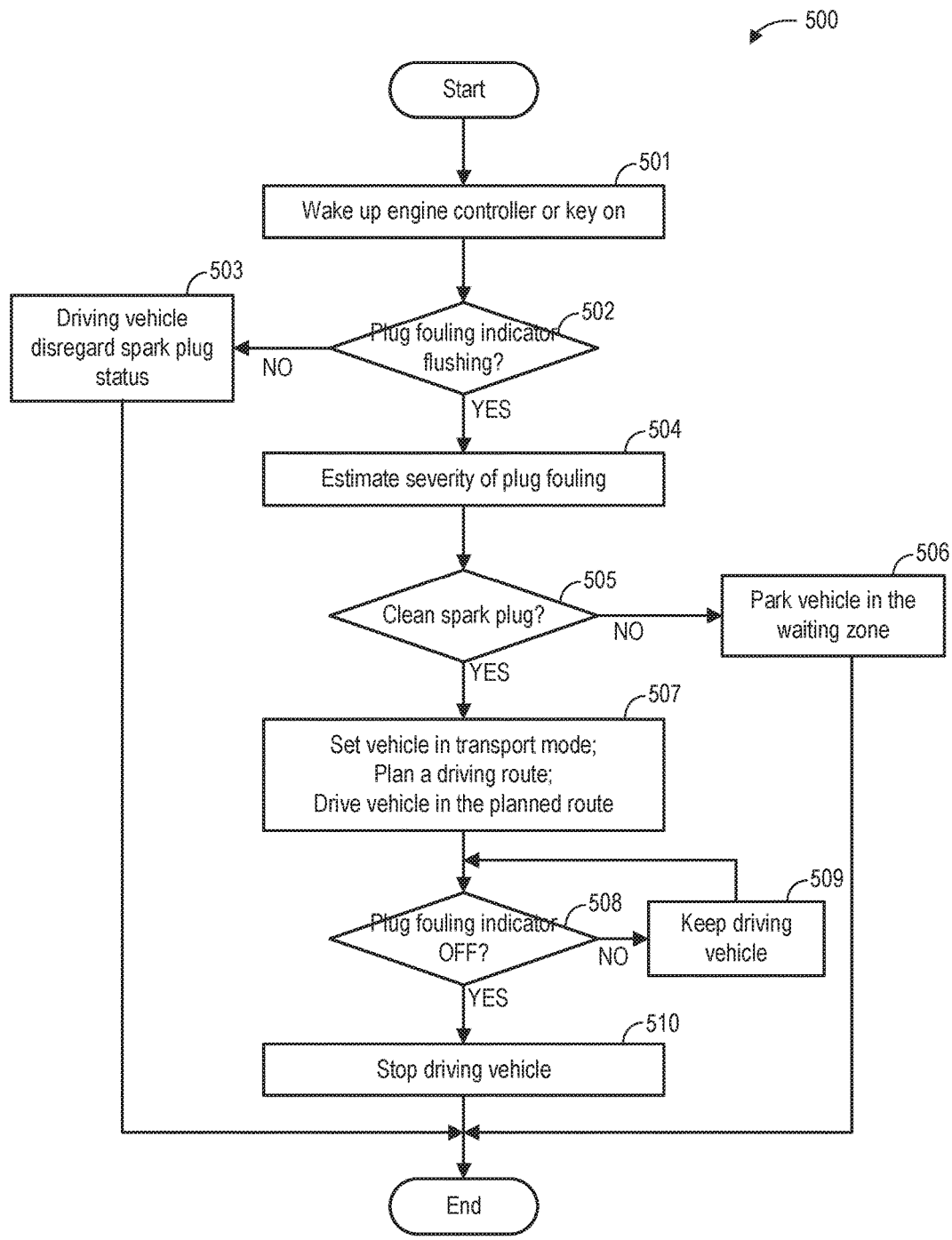
FIG. 5 illustrates an example method of cleaning fouled spark plug.
Figure 6:
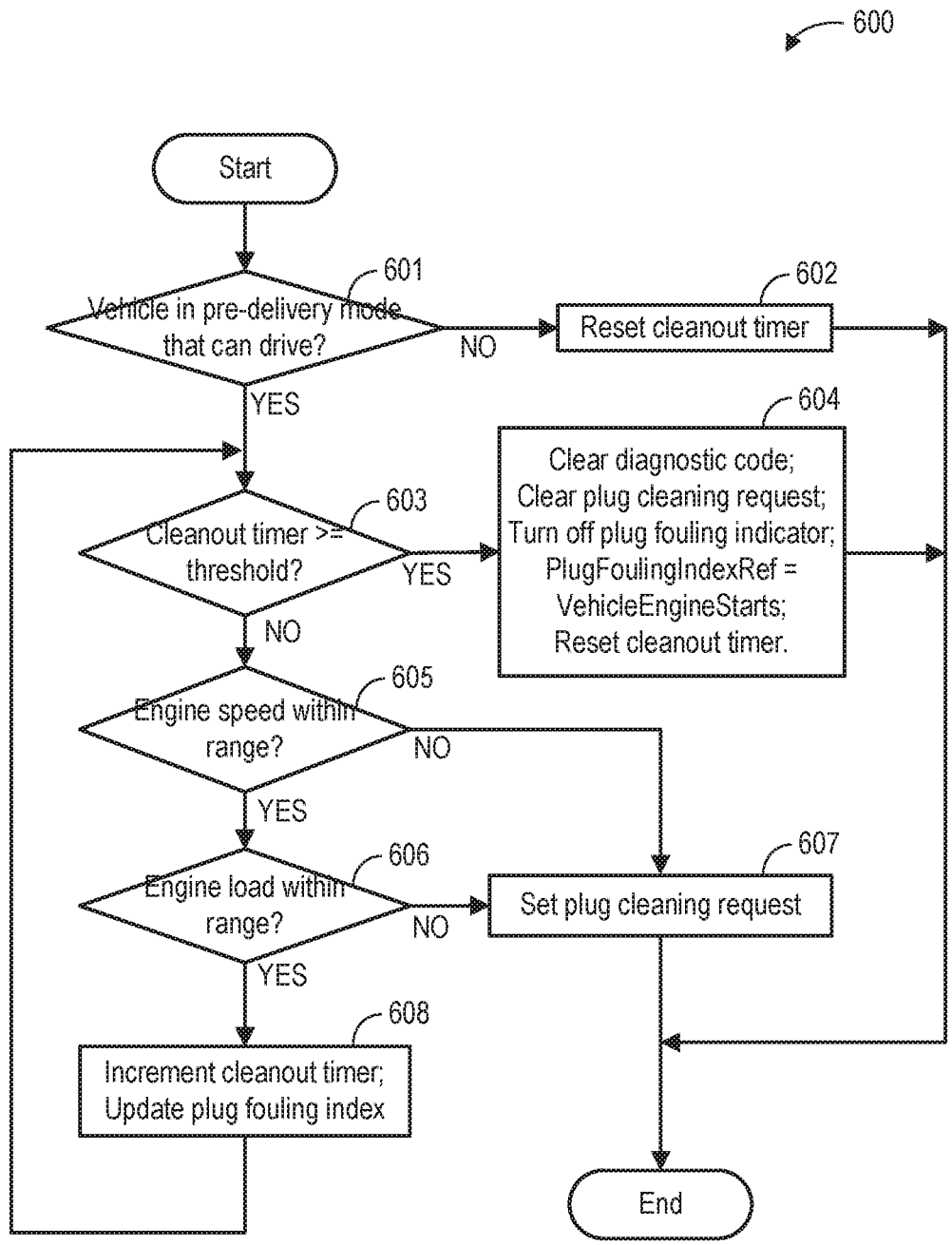
FIG. 6 shows a flow chart for monitoring spark plug cleaning.
Figure 7:
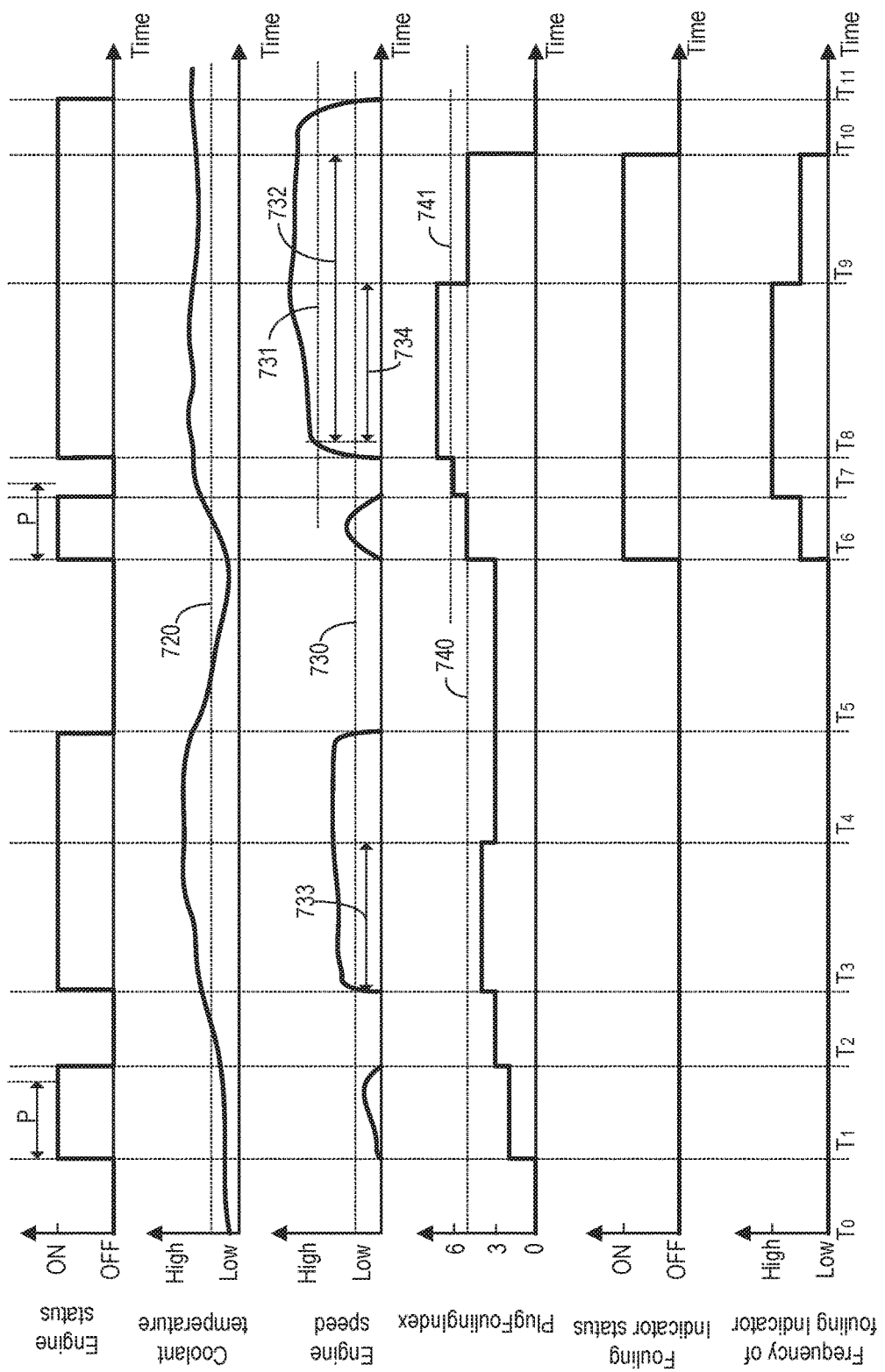
FIG. 7 shows time lines demonstrating the variation of engine parameters while monitoring spark plug status during the pre-delivery phase of the vehicle.

The following description relates to systems and methods for detecting spark plug fouling and cleaning the fouled spark plug during the pre-delivery phase of a vehicle. Due to frequent starts and short engine run times, a spark plug coupled to an internal combustion engine, such as the engine shown in FIG. 1, may be fouled before being delivered to the dealership. FIG. 2 shows an example method of tracking spark plug fouling with a spark plug fouling index saved in a nonvolatile memory of the vehicle. The spark plug fouling index may be updated during each engine run in the pre-delivery phase of the vehicle according to FIG. 3A. After vehicle delivery to the dealership, the spark plug fouling index may continue to be updated according to FIG. 3B. A spark plug fouling index in the post-delivery phase may imply system health and may be used for engine control. During the pre-delivery phase of the vehicle, a severity of plug fouling may be indicated via a plug fouling indicator based on the spark plug fouling index as shown in FIG. 4. In response to the indicated plug fouling, an inspector may operate the vehicle in a specific way to clean the spark plug by following a cleaning process shown in FIG. 5. FIG. 6 shows a method of monitoring the spark plug cleaning process. FIG. 7 demonstrates the variation of parameters related to engine operation and spark plug fouling while implementing the example method.

Figure 1:
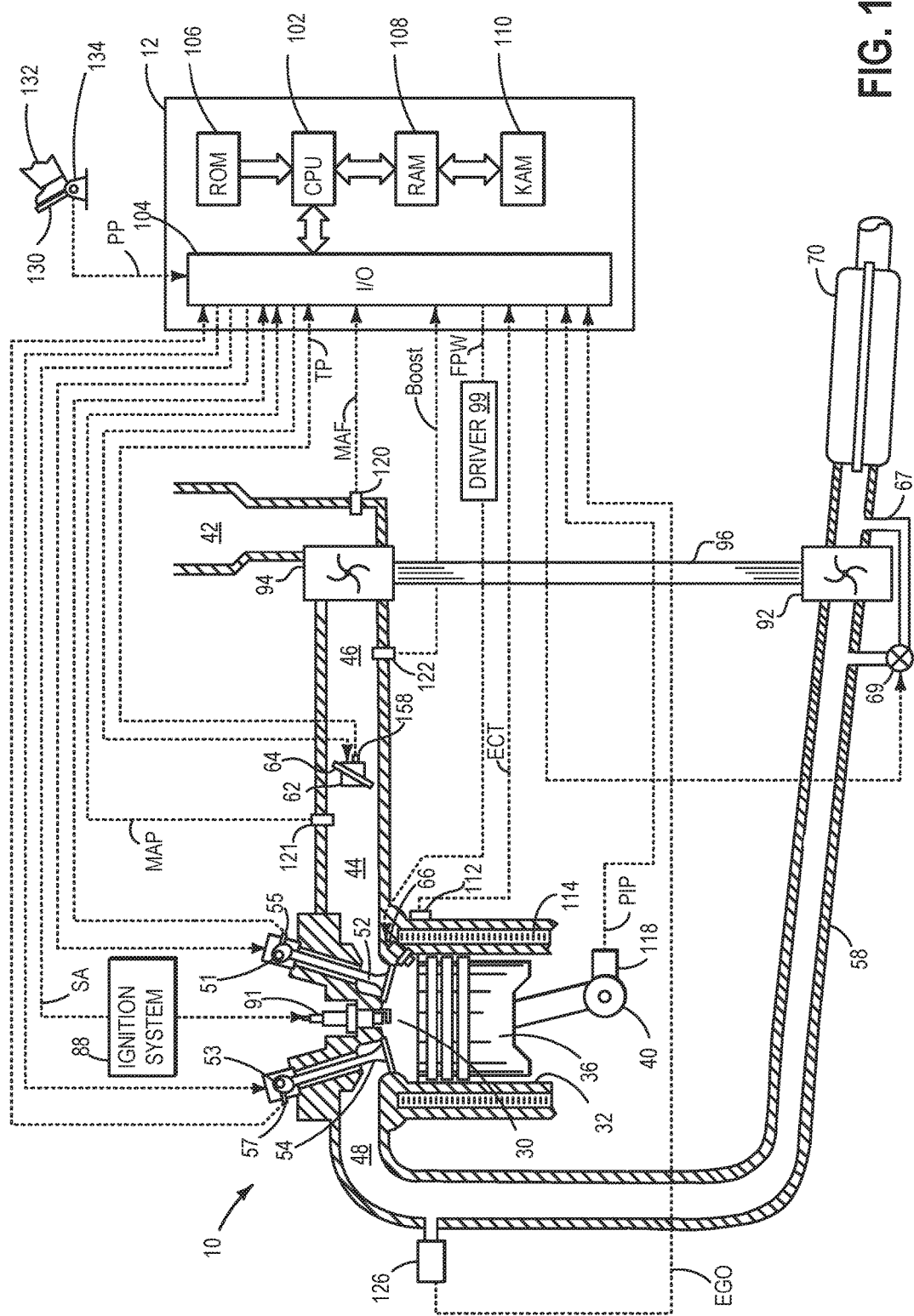
FIG. 1 shows a schematic diagram of an example combustion chamber in an engine of a vehicle.
Figure 2:
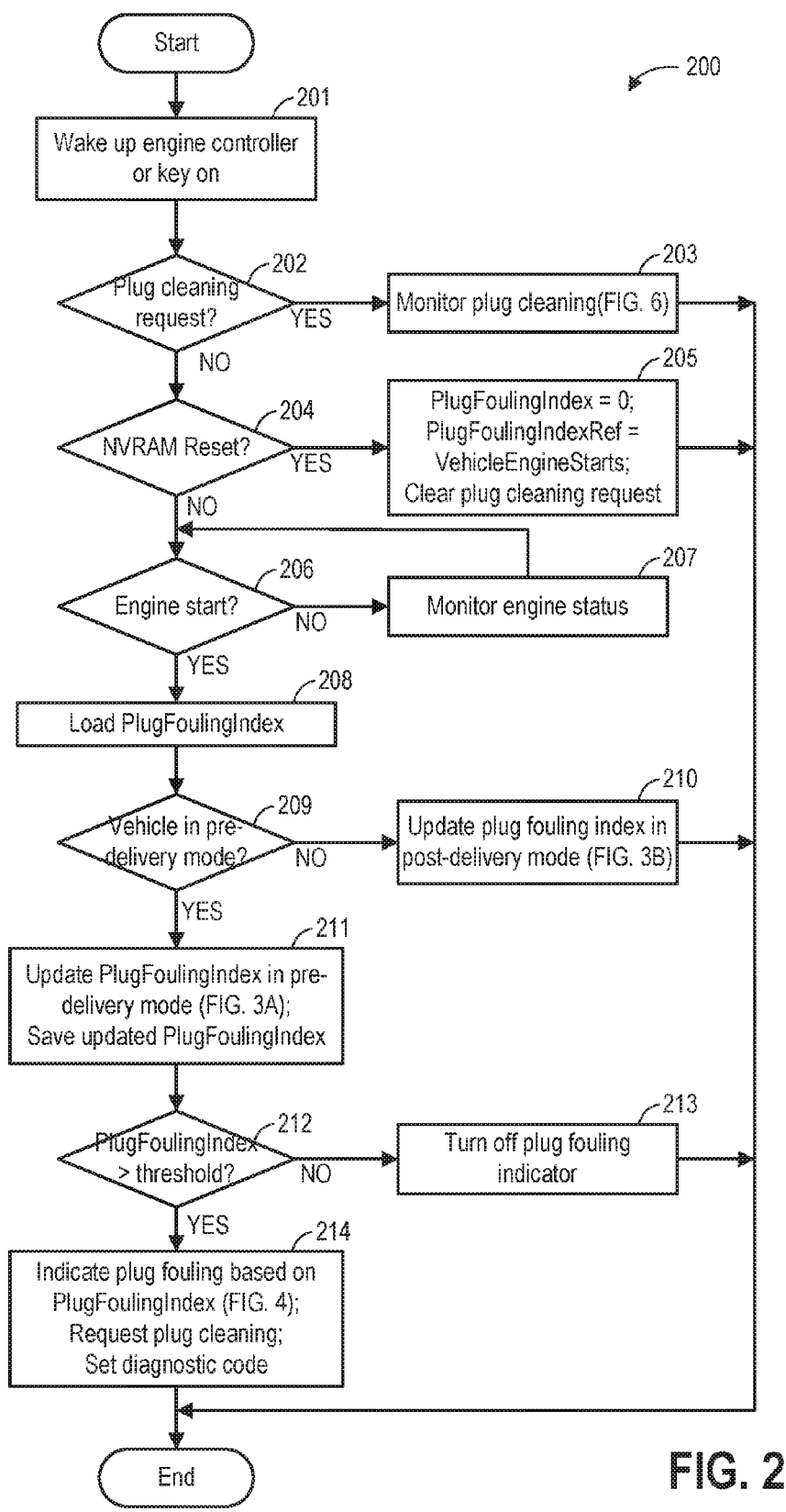
FIG. 2 shows a high level flow chart for monitoring spark plug fouling.

FIG. 1 shows a schematic depiction of an example cylinder 30 in internal combustion engine 10. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion chamber 30 (also known as, cylinder 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust manifold 48 and exhaust passage 58. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

In the example of FIG. 1, intake valve 52 and exhaust valve 54 may be controlled by cam actuation via respective cam actuation systems 51 and 53. Cam actuation systems 51 and 53 may each include one or more cams mounted on one or more camshafts (not shown in FIG. 1) and may utilize one or more of cam profile switching (CPS), variable cam timing (VCT), variable valve timing (VVT) and/or variable valve lift (VVL) systems that may be operated by controller 12 to vary valve operation. The angular position of intake and exhaust camshafts may be determined by position sensors 55 and 57, respectively. In alternate embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 99. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30. Ignition system 88 can provide an ignition spark to combustion chamber 30 via spark plug 91 in response to spark advance signal SA from controller 12, under select operating modes.

Engine 10 may further include a compression device such as a turbocharger or supercharger including at least a compressor 94 arranged along intake passage 42. For a turbocharger, compressor 94 may be at least partially driven by an exhaust turbine 92 (e.g. via a shaft) arranged along exhaust passage 58. Compressor 94 draws air from intake passage 42 to supply boost chamber 46. Exhaust gases spin exhaust turbine 92 which is coupled to compressor 94 via shaft 96. For a supercharger, compressor 94 may be at least partially driven by the engine and/or an electric machine, and may not include an exhaust turbine. Thus, the amount of compression provided to one or more cylinders of the engine via a turbocharger or supercharger may be varied by controller 12.

A wastegate 69 may be coupled across exhaust turbine 92 in a turbocharger. Specifically, wastegate 69 may be included in a bypass passage 67 coupled between an inlet and outlet of the exhaust turbine 92. By adjusting a position of wastegate 69, an amount of boost provided by the exhaust turbine may be controlled.

Intake manifold 44 is shown communicating with throttle 62 having a throttle plate 64. In this particular example, the position of throttle plate 64 may be varied by controller 12 via a signal provided to an electric motor or actuator (not shown in FIG. 1) included with throttle 62, a configuration that is commonly referred to as electronic throttle control (ETC). Throttle position may be varied by the electric motor via a shaft. Throttle 62 may control airflow from intake boost chamber 46 to intake manifold 44 and combustion chamber 30 (and other engine cylinders). The position of throttle plate 64 may be provided to controller 12 by throttle position signal TP from throttle position sensor 158.

Exhaust gas sensor 126 is shown coupled to exhaust manifold 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 58 downstream of exhaust gas sensor 126 and exhaust turbine 92. Device 70 may be a three way catalyst (TWC), NOx trap, various other emission control devices, or combinations thereof.

An exhaust gas recirculation (EGR) system (not shown) may be used to route a desired portion of exhaust gas from exhaust passage 58 to intake manifold 44. Alternatively, a portion of combustion gases may be retained in the combustion chambers, as internal EGR, by controlling the timing of exhaust and intake valves.

Controller 12 is shown in FIG. 1 as a conventional microcomputer including: microprocessor unit 102, input/output ports 104, read-only memory 106, random access memory 108, keep alive memory 110, and a conventional data bus. Controller 12 commands various actuators such as throttle plate 64, wastegate 69, fuel injector 66, and the like. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by vehicle operator 132; a measurement of engine manifold pressure (MAP) from pressure sensor 121 coupled to intake manifold 44; a measurement of boost pressure from pressure sensor 122 coupled to boost chamber 46; a profile ignition pickup signal (PIP) from Hall effect sensor 118 (or other type) coupled to crankshaft 40; a measurement of air mass entering the engine from mass airflow sensor 120; a measurement of throttle position from sensor 158; air/fuel ratio (AFR) from EGO sensor 128, and abnormal combustion from a knock sensor and a crankshaft acceleration sensor. In a preferred aspect of the present description, crankshaft sensor 118, which may be used as an engine speed sensor, may produce a predetermined number of equally spaced pulses for every revolution of the crankshaft from which engine speed (RPM) can be determined. Such pulses may be relayed to controller 12 as a profile ignition pickup signal (PIP) as mentioned above.

Storage medium read-only memory 106 may be a non-volatile memory and can be programmed with computer readable data representing instructions executable by processor 102 for performing the methods described below as well as other variants that are anticipated but not specifically listed.

As described above, FIG. 1 merely shows one cylinder of a multi-cylinder engine, and that each cylinder has its own set of intake/exhaust valves, fuel injectors, spark plugs, etc. Also, in the example embodiments described herein, the engine may be coupled to a starter motor (not shown) for starting the engine. The starter motor may be powered when the driver turns a key in the ignition switch on the steering column, for example. The starter is disengaged after engine start, for example, by engine 10 reaching a predetermined speed after a predetermined time.

The controller 12 receives signals from the various sensors of FIG. 1 and employs the various actuators of FIG. 1 to adjust engine operation based on the received signals and instructions stored on a memory of the controller. For example, adjusting the air fuel ratio may include adjusting the FPW signal sending to driver 99 to adjusting the amount of fuel injected to the cylinder.

FIG. 2 shows method 200 for monitoring spark plug status during the pre-delivery phase of a vehicle with a spark plug fouling index PlugFoulingIndex. The spark plug fouling index is saved in the vehicle memory even when the vehicle is off (key off). As an example, the spark plug fouling index may be saved in the nonvolatile memory such as read-only memory 106 in FIG. 1. As another example, the spark plug fouling index may be saved in the keep alive memory (such as keep alive memory 110 in FIG. 1), where in the memory is powered with battery when the vehicle is off. As yet another example, the spark plug fouling index may be saved in other dedicated nonvolatile memory. During each engine run, the spark plug fouling index may be updated. In response to the spark plug fouling index higher than a threshold, spark plug cleaning may be requested by flashing a plug fouling indicator.

Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 201, the controller (such as controller 12 in FIG. 1) is powered on. For example, the engine controller may be powered on in response to a key on event.

At 202, method 200 checks the presence of spark plug cleaning request. For example, controller 12 may check a plug cleaning request flag RB stored in a nonvolatile ram. If RB is set, method 200 moves to step 203, wherein the controller monitors the spark plug cleaning process, as shown in FIG. 6. Details about the spark plug cleaning process are shown in FIG. 5. If RB is not set, method 200 moves to step 204.

At 204, method 200 checks if there is a NVRAM reset command for resetting the parameters saved in the nonvolatile memory. As an example, the NVRAM reset command may be set when there are ECU memory related errors (e.g., checksum errors) or when a major engine component is replaced (the service engineer will reset NVRM by using a scan tool). In the absence of the NVRAM reset command, method 200 moves to 206. Otherwise, in response to a NVRAM reset command, method 200 moves to 205.

At 205, spark plug fouling index PlugFoulingIndex is reset to be zero. A reference parameter PlugFoulingIndexRef is set to be the same as the number of engine starts VehicleEngineStarts. The number of engine starts VehicleEngineStarts is a counter saved in the nonvolatile memory. In response to each engine start, counter VehicleEngineStarts increases by one. Further, the spark plug cleaning request is cleared (RB=0).

At 206, method 200 checks if the engine is started. The engine may be started when the piston in the cylinder is moving and the crankshaft is rotating. The engine may be started by initiating combustion in the cylinder. Alternatively, the engine may be started by driving the crankshaft via an electric motor. If the engine is started, method 200 moves to step 207 to continue monitoring engine conditions. Otherwise, method 200 moves to step 208 to load the PlugFoulingIndex from the memory.

At 209, method 200 determines if the vehicle is in the pre-delivery mode. The pre-delivery mode may be set during the production of the vehicle and be cleared before delivering the vehicle to the dealership. As an example, the pre-delivery mode may be determined by a worker using some specific tool during plant marshaling or by a vehicle inspector using a scan tool at the check gates. If the vehicle is in the pre-delivery mode, method 200 may update the spark plug fouling index in at 211 based on engine operating parameters, and save the updated spark plug fouling index back to the nonvolatile memory. Otherwise, if the vehicle is in the post-delivery mode, method 200 may update the spark plug fouling index at 210. Details about updating the spark plug fouling index in the pre-delivery and post-delivery mode are explained in FIG. 3A and FIG. 3B, respectively.

After updating the spark plug fouling index in the pre-delivery mode, method 200 compares the spark plug fouling index with a predetermined threshold at 212. In response to the index not higher than the threshold, method 200 may turn off the plug fouling indicator at 213. If the index is higher than the threshold, method 200 moves to 214.

At 214, severity of spark plug fouling is indicated via a plug fouling indicator based on the spark plug fouling index. Details about configuring the plug fouling indicator are shown in FIG. 4. Method 200 may request spark plug cleaning by setting the plug cleaning request (RB=1). Method 200 may also set a diagnostic code corresponding to spark plug fouling.

Figure 3A:
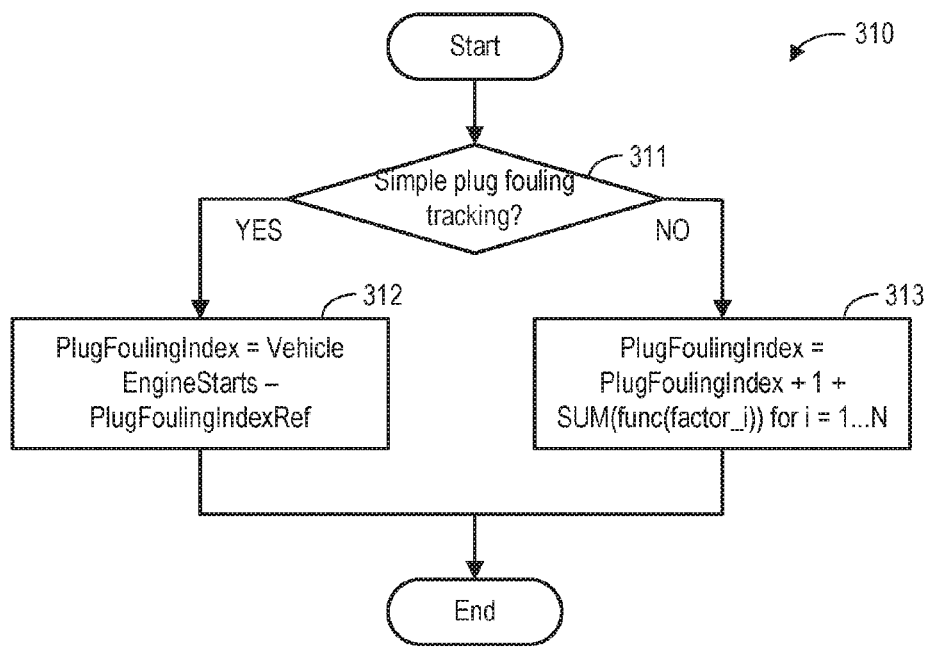
FIG. 3A shows a low level flow chart of updating a spark plug fouling index during pre-delivery phase of the vehicle.

FIG. 3A shows method 310 of updating the spark plug fouling index in the pre-delivery phase. The spark plug fouling index may be updated based solely on the number of engine starts. Alternatively, the spark plug fouling index may be updated based on a sum of various engine operating parameters.

At 311, method 310 determines whether to update the spark plug fouling index using a simple method. If the answer is YES, method 310 moves to 312. If the answer is NO, method 310 moves to 313.

At 312, spark plug fouling index is updated based solely on the number of engine starts. For example, spark plug fouling index PlugFoulingIndex may be calculated as the difference between number of engine starts VehicleEngineStarts and reference parameter PlugFoulingIndexRef. The reference parameter PlugFoulingIndexRef may be set to be equal to the VehicleEngineStarts in response to NVRAM reset or the completion of spark plug cleaning process.

At 313, the spark plug fouling index may be updated based on one or more of engine operating parameters, additional to the base increase of 1 due to engine start. As an example, N factors (or engine operating parameters) Factor_i (i=1 . . . N) related to spark plug fouling may be selected. As an example, Factor_i may be set to one if the i-th factor increases plug fouling. As another example, Factor_i may be set to negative one if the i-th factor decreases plug fouling. In one embodiment, the spark plug fouling index may be the sum of all the N factors. In another embodiment, each factor may be weighted differently through a function func( ) before summing up. For example, if factor_i has a stronger impact on plug fouling, it may be multiplied with a large coefficient before adding to other factors. Note that the spark plug fouling index may be a negative number due to negative Factor_i.

In one embodiment, the factor related to spark plug fouling may include engine coolant temperature. As an example, if the engine coolant temperature is lower than a first threshold at engine start, the spark plug fouling index may be increased. As another example, if the engine coolant temperature is lower than a second threshold at engine stop or at the end of an engine run period, the spark plug fouling index may be increased. The first and second threshold may be the same. In another embodiment, the factor related to spark plug fouling may include the duration of engine running time. The engine running time is the duration from an engine start to an engine stop. The spark plug fouling index may increase in response to the engine running time shorter than a threshold. In yet another embodiment, the factor related to spark plug fouling may include a duration that the engine retains an engine speed higher than a first threshold and an engine load higher than a second threshold. The spark plug fouling index may decrease in response to the duration longer than a threshold. The spark plug fouling index may alternatively be updated based on the engine torque output. For example, the index may decrease responsive to a duration of high engine torque output. In yet another embodiment, the factor related to spark plug fouling may include usage of alternative fuel systems. Aside from direct injection, the vehicle may port inject fuel into the cylinder, or the combination of the two (port fuel injection and direct injection). The port injected fuel may be of a different type from fuel injected through direct injection. If the engine runs on fuel via port injection, the spark plug fouling index may increase.

Figure 3B:
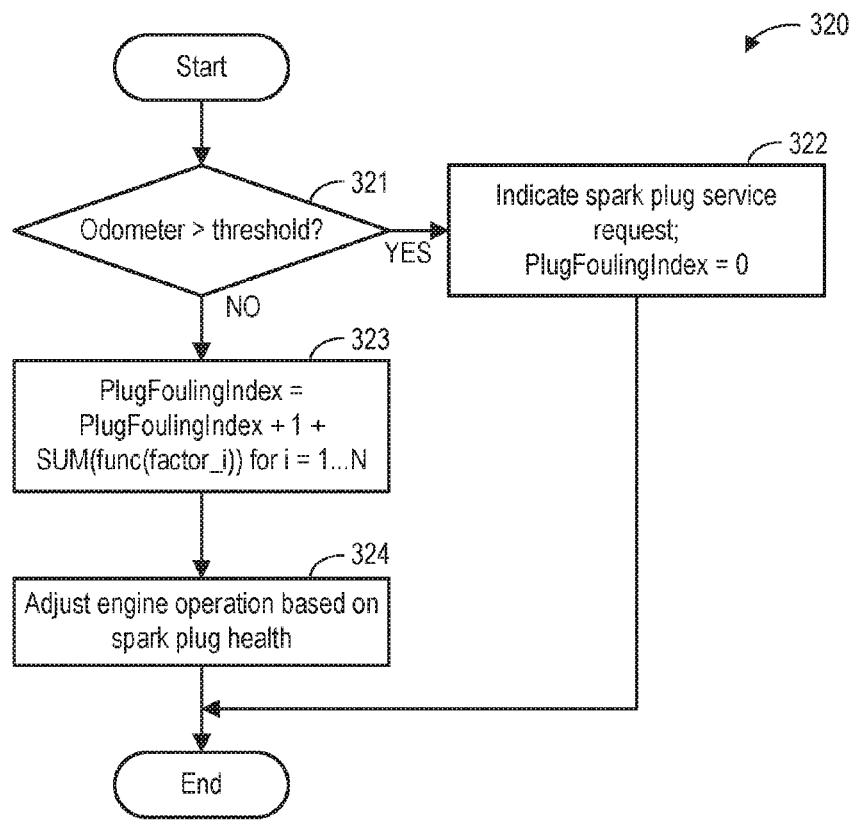
FIG. 3B shows a low level flow chart of updating the spark plug fouling index during post-delivery phase of the vehicle.

FIG. 3B shows method 320 of updating the spark plug fouling index in the post-delivery mode of the vehicle. The spark plug fouling index may be updated based on multiple engine operating parameters and used as an indicator of ignition system health. Different from the pre-delivery mode, in the post-delivery mode, both the spark plug cleaning request and the plug cleaning indicator are disabled (turned off).

At 321, method 320 checks the vehicle odometer. If the odometer reading is higher than a threshold, spark plug service request will be indicated at step 322. The threshold relates to the lifetime of the spark plug. As an example, spark plug service request may be indicated by light up a spark plug service light. Step 322 may also include resetting spark plug fouling index to zero. If the odometer reading is not higher than the threshold, method 320 moves to step 323, wherein the park plug fouling index is updated similar to step 313 in FIG. 3A.

At 324, engine operation may be adjusted based on the spark plug health to mitigate plug fouling. The spark plug fouling index may reflect the spark plug health. For example, lower spark plug fouling index indicates a healthier spark plug. As one example, the engine may be operated to increase air-fuel ratio in response to a high spark plug fouling index. As another example, the engine may be operated to increase the temperature of the spark plugs to burn the deposits on the spark plug, such as increase the electric current, and operating the engine in the way for higher engine speed or engine load zones in response to a high spark plug fouling index. Note that it is critical that the engine control strategy for high spark plug fouling index should fully compile with the emission regulations of the country.

FIG. 4 shows method 400 of indicating spark plug fouling via a fouling indicator when the request for plug cleaning is set. Severity of plug fouling is indicated by adjusting the frequency of the plug fouling indicator based on the spark plug fouling index. Method 400 may run in parallel with method 200 in FIG. 2 or method 600 in FIG. 6, whenever the spark plug cleaning request is set.

At 401, method 400 compares spark plug fouling index PlugFoulingIndex with threshold T1. If the index is higher than T1, the index is further compared with threshold T2 at 403, wherein T2 is larger than T1. If the index is not higher than T1, the fouling indicator is set to flash at frequency P1 at 402. If the index is not higher than T2, the fouling indicator is set to flash at frequency P2 at 404, wherein P2 is higher than P1. If the index is higher than T2, the fouling indicator is set to flash at frequency P3 at 405, where in P3 is higher than P2. In this way, the fouling indicator flashes at higher frequency responsive to larger spark plug fouling index. In another embodiment, the frequency of the fouling indicator may be set as a function of the fouling index. For example, the frequency may increase proportionally to the fouling index.

At 406, a timer PlugFoulingFlshCnt is initiated to zero. At 407, the timer is compared with a flash period, which is the reciprocal of the frequency determined from 401 to 405. If the timer is not exceeding the period, the timer increases with time. Once the timer exceeds the flash period, plug fouling indicator reverses its status and reset the timer to zero at 409. For example, the plug fouling indicator may reverse to an OFF state if its current state is ON. In this way, the indicator flashes at the frequency determined based on the spark plug fouling index.

At 410, method 400 determines whether to continue indicating plug fouling. The method may stop indicating plug fouling when the request for spark cleaning is disabled. Alternatively, the method may determine to stop indicating plug fouling when the spark plug fouling index is zero or negative. If it is determined to stop indicate plug fouling, method 400 disables or turns off the fouling indicator at step 411. Otherwise, method 400 goes back to step 406.

In another embodiment, the intensity of the fouling indicator may set as a function of the fouling index. For example, the intensity may increase with increased fouling index.

FIG. 5 shows an example cleaning process 500 for a factory or dealership inspector during the pre-delivery phase of the vehicle. The cleaning process requires the inspector to drive the vehicle at engine speed and engine load within a range for a predefined duration to remove spark plug fouling.

At 501, the inspector may wake up the engine controller. As an example, the engine controller may be woken up in response to a key on event. As another example, the engine controller may be woken up by opening a driver side door of the vehicle.

At 502, the inspector checks whether the plug fouling indicator is flashing. If the plug fouling indicator is not flashing, at 503, the inspector may drive the vehicle disregard the status of the spark plug. If the plug fouling indicator is flashing, at 504, the inspector may determine the severity of plug fouling based on the flashing frequency of the fouling indicator. For example, the fouling is more severe when the fouling indicator flashes at a higher frequency.

At 505, the inspector determines whether to clean the spark plug. If the inspector determines not to clean the spark plug, process 500 moves to 506, wherein the inspector may park the vehicle in the waiting zone. If the inspector decides to clean the spark plug, process 500 goes to 507.

At 507, the inspector may set the vehicle to transport mode, plan a route, and drive the vehicle in the planned route. The route may be long enough for the vehicle to maintain moderate engine speed and engine load without too many stops. The length of the planed route may be determined based on the severity of the fouling determined at 504. For example, the planed route may be longer responsive to more severe plug fouling. As an example, the inspector may maintain the engine speed above 3000 RPM and engine load above 40% while driving the vehicle in the planed route. The engine controller may monitor the plug cleaning process as shown in FIG. 6.

At 508, the inspector checks the status of the plug fouling indicator. If the indicator is flashing, the inspector keeps driving the vehicle at 509. If the indicator is OFF, the inspector may stop driving the vehicle at 510. At 510, the inspector may further switch the vehicle back to the pre-delivery mode if cleaning process 500 is carried on in the factory.

FIG. 6 shows method 600 of monitoring the spark plug cleaning process. During the pre-delivery phase of the vehicle, in response to a spark plug cleaning request, an inspector may drive the vehicle at a specific engine speed and engine load to clean up the spark fouling, such as shown in FIG. 5. At the same time, vehicle controller (such as controller 12 in FIG. 1) may execute method 600 in parallel with method 500 to monitor the progress of plug cleaning. For example, the controller may indicate the progress by updating the frequency of the plug fouling indicator, and reset the plug cleaning request and plug fouling indicator upon completion of the plug cleaning process.

At 601, method 600 determines if the vehicle is in the pre-delivery mode and drivable. The vehicle may be drivable in the pre-delivery mode if the operator set the vehicle in a transport mode. The transport mode may be a mode of a new vehicle after the vehicle is built and before it is delivered to the dealership. If the answer is NO, method 600 moves to 602, wherein a cleanup timer is reset to zero. If the answer at 601 is YES, method 600 moves to 603.

At 603, method 600 determines of the cleanout timer is larger than a threshold. In an embodiment, the threshold may be set to be proportional to the spark plug fouling index, so that severe plug fouling may require longer driving time to clean up. If the answer is YES, the spark plug cleaning process moves to 604. At 604, method 600 clears the diagnostic code related to plug fouling and the plug cleaning request. The plug fouling indicator is turned off, and PlugFoulingIndexRef is set to be the number of vehicle engine start VehicleEngineStarts. Further, the cleanout timer is reset to zero. If the answer at 603 is NO, method moves to 605.

At 605 and 606, method 600 determines if current engine speed and engine load are within a range. The range may be a predetermined range. For example, the range may be engine speed higher than 3000 RPM and engine load>=40%. In another embodiment, the range may be determined based on the spark plug fouling index. For example, the range may be defined as engine speed higher than a first threshold and engine load higher than a second threshold, and the first and second thresholds may increase with increased spark plug fouling index. If the engine load or speed is out of the range, method 600 moves to 607 to set the spark plug cleaning request. Otherwise, method 600 moves to 608.

At 608, the cleanout timer increases with time. Further, method 600 may update the plug fouling index based on the cleanout timer. As an example, the spark plug fouling index may decrease with increased cleanout timer. As another example, the spark plug fouling index may decrease when the cleanout timer is higher than a threshold. In this way, flashing frequency of the plug fouling indicator may decrease with the progression of the cleaning process. By checking the plug fouling indicator, the inspector may know the progress of cleaning process.

FIG. 7 shows the variation of parameters related to engine operation and plug fouling during the pre-delivery mode of the vehicle while implementing the methods disclosed above. The x-axes of the graphs are time. The time increases from left to right as indicated by the arrow. The first graph from top illustrates engine status, specifically engine ON or OFF status. When engine status is ON, the engine starts running or the crankshaft starts rotating. The second graph from top is the engine coolant temperature. The third graph from the top is engine speed. The fourth graph from the top is the spark plug fouling index PlugFoulingIndex. Note that though the spark fouling index shown in the graph is zero or positive integer, the spark fouling index may be negative. When the spark fouling index is negative, the fouling indicator is disabled. In another embodiment, the spark fouling index may be fraction. The fifth graph from the top is the status of the plug fouling indicator. The status of the indicator may be ON or OFF. When the status is ON, the indicator is supplied with power and may be flashing at a frequency shown in the sixth graph from the top. In the sixth graph, arrow of the y-axis indicates increased flashing frequency.

From $T_0$ to $T_1$, the engine is off with engine speed of zero. The engine coolant temperature is lower than threshold 720. The spark plug fouling index is zero, and plug fouling indicator is OFF.

At $T_1$, in response to engine start, spark plug fouling index increases one. Since engine coolant temperature is lower than threshold 720 at engine start, spark plug fouling index is increased by one. As such, spark plug fouling index becomes two. At $T_2$, engine stops. Since the engine running time during this run period from $T_1$ to $T_2$ is longer than a threshold P as shown in the first graph, the spark plug fouling index is not updated based on the engine running time. However, since the engine coolant temperature is still lower than threshold 720 at engine stop, the spark plug fouling index is increased by one and becomes three.

At $T_3$, in response to a new engine start, spark plug fouling index becomes four. The engine coolant temperature exceeds threshold 720. As such, the index is not updated based on the coolant temperature. From $T_3$ to $T_4$, engine speed increases and is above threshold 730. At $T_4$, in response to the engine speed staying above threshold 730 for a period 733, the spark plug index decreases by one and becomes three. At $T_5$, the engine stops with engine coolant temperature higher than threshold 720, and the spark plug index remains three.

At $T_6$, engine starts after stopping from $T_5$ to $T_6$. The spark plug index increases by two. The increase is due to the engine start and the engine coolant temperature lower than threshold 720. In response to the spark plug index reaching threshold 740, the plug fouling indicator is turned ON and flashes at a frequency as shown in the sixth graph from the top of FIG. 7. At $T_7$, the engine stops with an engine coolant temperature higher than threshold 720. Since the engine running time from $T_6$ to $T_7$ is shorter than the threshold P, the spark plug fouling index is increased by one. In response to the plug fouling index reaching threshold 741, the plug fouling indicator flashes at a second frequency, which is higher than the first frequency.

At $T_8$, in response to a flashing plug fouling indicator, the inspector starts the engine and proceeds to clean up the fouled spark plug. The spark plug fouling index increases by one responsive to the engine start. From $T_8$ to $T_9$, the inspector drives the engine to a speed higher than threshold 731 for a duration of 734. As a result, the spark plug fouling index decreases by two, and the frequency of the plug fouling indicator also decreases to the first frequency. At $T_{10}$, in response to engine speed over threshold 731 for a duration of 732, engine controller determines completion of the spark plug cleaning process and resets the spark plug fouling index to zero. The engine controller also turns off the plug fouling indicator at $T_{10}$. When the inspector finds the plug fouling indicator is turned off, he may stop the vehicle at $T_{11}$. As such, the spark plug fouling indicator keeps being updated during the cleaning process. Therefore, the inspector may know the progress of the cleaning progress by checking the plug fouling indicator.

Note that though only engine speed is shown in FIG. 7, engine load may follow the same trend as engine speed. The spark plug fouling index may be updated based on both the engine speed and engine load.

In this way, spark plug fouling may be detected and the fouled spark plug may be cleaned before delivering the vehicle to the dealership. The technical effect of tracking the spark plug status with the spark plug fouling index saved in the non-volatile memory of the vehicle is that the method takes account of residues accumulated over multiple engine run period. The technical effect of flashing the plug fouling indicator based on the spark plug fouling index is that the severity of plug fouling may be reported to the inspector. The technical effect of cleaning the spark plug by driving the vehicle with engine speed and engine load within a range for a duration is that the fouled spark plug may be cleaned noninvasively. The technical effect of indicating spark plug fouling index during plug cleaning process is that the inspector may know the progress of the cleaning process.

As one embodiment, a method comprising: during a pre-delivery phase of a vehicle, increasing a spark plug fouling index saved in a nonvolatile memory in response to an engine start; and operating the engine to clean the spark plug in response to the updated spark plug fouling index higher than a threshold. In a first example of the method, wherein the spark plug fouling index is updated solely responsive to the number of engine start. A second example of the method optionally includes the first example and further includes updating the spark plug fouling index based on an engine coolant temperature. A third example of the method optionally includes one or more of the first and second examples, and further includes, wherein the spark plug fouling index is increased responsive to the engine coolant temperature below a threshold at the start of an engine running period. A fourth example of the method optionally includes one or more of the first through third examples, and further includes, wherein the spark plug fouling index is increased responsive to the engine coolant temperature below a threshold at the end of an engine running period. A fifth example of the method optionally includes one or more of the first through fourth examples, and further includes, decreasing the spark plug fouling index responsive to an engine speed higher than a first threshold and an engine load higher than a second threshold for a duration longer than a threshold. A sixth example of the method optionally includes one or more of the first through fifth examples, and further includes, increasing the spark plug fouling index responsive to an engine running time shorter than a threshold. A seventh example of the method optionally includes one or more of the first through sixth examples, and further includes, decreasing the spark plug fouling index when using alternative fuel system calibrations during vehicle manufacturing. An eighth example of the method optionally includes one or more of the first through seventh examples, and further includes, resetting the spark plug fouling index when the spark plug is cleaned.

As another embodiment, a method comprising: starting an engine; loading a spark plug fouling index from a memory; updating the spark plug fouling index; saving the updated spark plug fouling index to the memory; and flashing a indicator light at a frequency based on the updated spark plug fouling index during a pre-delivery phase of a vehicle. In a first example of the method, further comprising turning off the indicator light after operating the engine at an engine torque output higher than a threshold for longer than a time duration. A second example of the method optionally includes the first example and further includes, wherein the time duration is adjusted based on the spark plug fouling index. A third example of the method optionally includes one or more of the first and second examples, and further includes, wherein the threshold is adjusted based on the spark plug fouling index. A fourth example of the method optionally includes one or more of the first through third examples, and further includes, wherein the spark plug fouling index is updated by increasing the spark plug fouling index responsive to each engine start. A fifth example of the method optionally includes one or more of the first through fourth examples, and further includes, wherein the indicator light is flashed at a higher frequency responsive to increased spark plug fouling index. A sixth example of the method optionally includes one or more of the first through fifth examples, and further includes, disabling the indicator light when the spark plug fouling index is below or equal to zero. A seventh example of the method optionally includes one or more of the first through sixth examples, and further includes operating the vehicle to clean the spark plug in response to the flashed indictor light during the pre-delivery phase of the vehicle. An eighth example of the method optionally includes one or more of the first through seventh examples, and further includes comprising disabling the indicator light in a post-delivery phase of the vehicle, and tracking health of the spark plug using the spark plug fouling index.

As yet another embodiment, a vehicle system comprising: an engine; a spark plug coupled to a cylinder of the engine; a controller configured with computer readable instructions stored on non-transitory memory for: loading a spark plug fouling index saved in a non-volatile memory in response to engine start; during a pre-delivery phase of the vehicle, updating the spark plug fouling index based on engine operating conditions; and indicating the severity of spark plug fouling based on the spark plug fouling index. In a first example of the system, wherein the controller is configured for updating the spark plug fouling index based on engine operating conditions including one or more of engine coolant temperature, engine speed, engine load, and engine running time during an engine cycle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system comprising:
   an engine;
   a spark plug coupled to a cylinder of the engine;
   a controller configured with computer readable instructions stored on non-transitory memory for:
   loading a spark plug fouling index saved in a nonvolatile memory in response to engine start;
   during a pre-delivery phase of the vehicle, updating the spark plug fouling index based on engine operating conditions; and
   indicating the severity of spark plug fouling based on the spark plug fouling index.

2. The vehicle system of claim 1, wherein the controller is configured for updating the spark plug fouling index based on engine operating conditions including one or more of engine coolant temperature, engine speed, engine load, and engine running time during an engine cycle.

3. A method comprising:
   during a pre-delivery phase of a vehicle, increasing a spark plug fouling index saved in a nonvolatile memory in response to an engine start; and
   operating the engine to clean the spark plug in response to the updated spark plug fouling index higher than a threshold.

4. The method of claim 3, wherein the spark plug fouling index is updated solely responsive to the number of engine start.

5. The method of claim 3, further comprising updating the spark plug fouling index based on an engine coolant temperature.

6. The method of claim 5, wherein the spark plug fouling index is increased responsive to the engine coolant temperature below a threshold at the start of an engine running period.

7. The method of claim 5, wherein the spark plug fouling index is increased responsive to the engine coolant temperature below a threshold at the end of an engine running period.

8. The method of claim 3, further comprising decreasing the spark plug fouling index responsive to an engine speed higher than a first threshold and an engine load higher than a second threshold for a duration longer than a threshold.

9. The method of claim 3, further comprising increasing the spark plug fouling index responsive to an engine running time shorter than a threshold.

10. The method of claim 3, further comprising decreasing the spark plug fouling index when using alternative fuel system calibrations.

11. The method of claim 3, further comprising resetting the spark plug fouling index when the spark plug is cleaned.

12. A method comprising:
    starting an engine;
    loading a spark plug fouling index from a memory;
    updating the spark plug fouling index;
    saving the updated spark plug fouling index to the memory; and
    flashing an indicator illuminated at a frequency based on the updated spark plug fouling index during a pre-delivery phase of a vehicle.

13. The method of claim 12, further comprising turning off the indicator after operating the engine at an engine torque output higher than a threshold for longer than a time duration.

14. The method of claim 13, wherein the time duration is adjusted based on the spark plug fouling index.

15. The method of claim 13, wherein the threshold is adjusted based on the spark plug fouling index.

16. The method of claim 12, wherein the spark plug fouling index is updated by increasing the spark plug fouling index responsive to each engine start.

17. The method of claim 12, wherein the indicator is flashed at a higher frequency responsive to increased spark plug fouling index.

18. The method of claim 12, further comprising disabling the indicator when the spark plug fouling index is below or equal to zero.

19. The method of claim 12, further comprising operating the vehicle to clean the spark plug in response to the flashed indictor during the pre-delivery phase of the vehicle.

20. The method of claim 12, further comprising disabling the indicator in a post-delivery phase of the vehicle, and tracking health of the spark plug using the spark plug fouling index.

* * * * *